2,930,737

PROCESS FOR THE ISOLATION OF RELAXIN USING GLACIAL ACETIC ACID

Herman Cohen, Princeton, N.J., assignor to Princeton Laboratories, Inc., Princeton, N.J., a corporation of New Jersey No Drawing. Application November 15, 1955
Serial No. 547,025

9 Claims. (Cl. 167—74)

My present invention relates to a method of preparing a product rich in relaxin, the relaxative hormone of pregnancy. This hormone has been found in various tissues of female mammals, it is prevalent in ovarian tissue of the female, and more prevalent in the ovarian tissue of the pregnant female mammal. A particularly good source of this hormone is the ovaries of pregnant sows. It has recently been demonstrated that the relaxative hormone is of therapeutic benefit in human females threatened with abortion, as noted by Abramson et al. (Journal of Clinical Endocrinology, 15:206, 1955) and in menstrual dyscrasias, particularly dysmenorrhea, as noted by Rezek (American Journal of Obstetrics and Gynecology, 66:396, 1953).

Previous methods proposed for isolation and purification of the relaxative hormone have included an organic salt precipitating procedure, an organic precipitating process utilizing alcohol, or combinations of both methods. These previously disclosed methods are laborious and not readily applicable to large scale production of this beneficial hormone. In addition to the above limitations, the hormone produced thereby requires numerous subsequent purification processes to insure against toxicity.

An object of my present invention is to obtain a highly purified and strongly active relaxin preparation utilizing a simple single step extraction process.

A further object of this invention is a relaxin product which readily lends itself to further purification processes.

Another object of this invention is a process for isolating relaxin which is more suited for mass production techniques than previous methods.

A still further object of this invention is to produce a relaxative hormone preparation having a high concentration of hormone and containing a minimum of inert materials.

The process is described hereinafter.

Source material containing the relaxative hormone is finely ground by any suitable means. The lipids and water are then removed with an aliphatic oxygenated solvent such as alcohol or acetone; I have found suitable source material in ovarian tissue from slaughtered animals, and in particular, I prefer to use ovaries from pregnant sows. The treated tissue is then dried by any of the well known means such as be dessication or by subjection of the tissue to forced air, to promote evaporation.

The dried tissue is then suspended in, or washed in, an anhydrous organic acid, in a single step extraction process. In this step, I prefer to use glacial acetic acid. To promote the extraction process, I prefer to heat the solution and agitate it frequently during this step. The temperature range useful in promoting extraction I have found to exist between ambient and the boiling point of the anhydrous organic acid. I have also determined that the percentage of extraction is proportional to the time and temperature involved, and to a lesser degree to the amount of agitation.

At a temperature of 70 degrees centigrade, I have found that extraction is essentially complete after thirty minutes, however, I emphasize that temperature, time and amount of agitation mutually affect the percentage of extraction, and therefore, specific conditions must be considered to arrive at the optimum determination of these factors. The extraction of the hormone at ambient temperature or less, over prolonged periods, is considered within the scope of this invention.

When sufficient extraction is effected, the solution is filtered to remove the solids. I have found filter-aids such as diatomaceous earth, suitable for this step. The residue is then discarded and the filtered solution is then ready for the subsequent phase whereby the active hormone is separated from the extract. Separation may be accomplished by any of the well known means for removing molecular particles from solution, but I have found that precipitation is a suitable and economical method for large scale separation. As a precipitating agent I prefer to use any of the class of low-polar hydrocarbon solvents such as alcohol, acetone, ether and petroleum ether. The above mentioned solvents and others useful in the precipitation step are characterized by having low dielectric constants. Since it will be obvious to those versed in the art that there are numerous methods of separating the hormone from solution, I do not propose the scope of my invention be limited to the herein described method of separation by precipitation.

The resulting precipitate is collected by filtration, and represents the relaxative hormone having a potency of between 20 to 30 guinea pig units per milligram of protein, when assayed by the method of Abramowitz et al. (Endocrinology 34:103, 1933). The ash content of this material is less than 0.5%.

The relaxative hormone may now be further purified by known means, however, I prefer to dissolve the precipitate in dilute mineral acids and adsorbing onto oxidized cellulose for approximately 24 hours. The oxidized cellulose is removed by centrifugation or other means, washed with 0.1 N acetic acid, and the active principle is eluted by stirring with a solution of mineral acid at pH 1.0. The resulting eluate is collected and precipitated with 20 volumes of acetone, or freeze dried after neutralization. The resulting product represents relaxative hormone with a potency of from 300 to 500 guinea pig units per milligram of solids.

Other variations in the process will be apparent to those versed in the art, and any departure from the specific examples recited, are deemed to be within the scope of my invention.

I claim:

1. The method of isolating relaxin from ovarian tissue containing it, which method comprises contacting substantially defatted and dried ovarian tissue with glacial acetic acid for sufficient time to recover therefrom a sufficient quantity of relaxin, removing the resulting solution of relaxin in the acetic acid from the insoluble tissue residue; separating the dissolved relaxin from said solution of it removed from the tissue residue, by adding to that solution sufficient of an organic solvent selected from the class consisting of ethanol, acetone, ethyl ether, and petroleum ether, to precipitate the protein relaxin dissolved in the removed solution.

2. The process of isolating relaxin as claimed in claim 1, wherein the ovarian tissue is immersed in the acid and contacted therewith at an elevated temperature below the boiling point of the acid.

3. The method of isolating relaxin from ovarian tissue, which method comprises immersing substantially defatted and dried ovarian tissue in glacial acetic acid and contacting the tissue therewith at an elevated temperature below the boiling point of the acid for sufficient time to recover therefrom a sufficient quantity of relaxin, removing the resulting solution of relaxin from the insoluble tissue residue; and separating the dissolved relaxin from said solution of it removed from the tissue residue.

4. The process of isolating relaxin from ovarian tissue, which comprises grinding the tissue, removing lipids and water therefrom by contacting it with a sufficient quantity of a solvent selected from the class consisting of ethanol and acetone, removing said solvent from the thus defatted and dehydrated tissue, and immersing the latter in glacial acetic acid for sufficient time to recover therefrom a sufficient quantity of relaxin, removing the resulting solution of relaxin in the acid from the insoluble tissue residue, and separating the dissolved relaxin from the solution of it removed from the tissue residue, by adding to that solution a sufficient quantity of a member of the class consisting of ethanol, acetone, ethyl ether, and petroleum ether, to precipitate the relaxin from that removed solution; and removing the thus precipitated relaxin from the resulting mixture.

5. The method of isolating relaxin from female mammalian tissue containing it, which method comprises contacting substantially defatted and dried female mammalian tissue containing relaxin with glacial acetic acid for sufficient time to recover therefrom a sufficient quantity of relaxin, removing the resulting solution of relaxin in the acetic acid from the insoluble tissue residue; and separating the dissolved relaxin from said solution of it removed from the tissue residue.

6. The method of isolating relaxin as claimed in claim 5, wherein the tissue immersed in the acid is contacted with it at an elevated temperature below the boiling point of the acid.

7. The process of isolating relaxin from ovarian tissue, which comprises grinding the tissue, removing lipids and water therefrom by contacting it with an aliphatic oxygenated dehydrating agent inert to the tissue and which is also a solvent for the lipids and is a member of the class consisting of ethanol and acetone, removing said solvent with its dissolved solute from the thus dehydrated and defatted tissue, and immersing the latter in glacial acetic acid and contacting said tissue with the acid at an elevated temperature below its boiling point and for sufficient time to recover therefrom a sufficient quantity of relaxin, removing the resulting solution of relaxin in the acid from the insoluble tissue residue, and separating the dissolved relaxin from said solution of it removed from the tissue residue.

8. The process of isolating relaxin from ovarian tissue, which comprises grinding the tissue, removing lipids and water therefrom by contacting it with an aliphatic oxygenated dehydrating agent which is also a solvent for the lipids and a member of the class consisting of ethanol and acetone, removing the solvent with its dissolved solute from the thus dehydrated and defatted tissue, and immersing the latter in glacial acetic acid and contacting said tissue with the acid for sufficient time to recover therefrom a sufficient quantity of relaxin, removing the resulting solution of relaxin in the acid from the insoluble tissue residue, and separating the dissolved relaxin from said solution of it removed from the tissue residue.

9. The process of isolating relaxin from ovarian tissue, which comprises grinding the tissue, removing lipids and water therefrom by contacting it with an aliphatic oxygenated dehydrating agent inert to the tissue and which is also a solvent for the lipids and is a member of the class consisting of ethanol and acetone, removing said solvent with its dissolved solute from the thus dehydrated and defatted tissue, and immersing the latter in glacial acetic acid and contacting said tissue with the acid for sufficient time to recover therefrom a sufficient quantity of relaxin, removing the resulting solution of relaxin in the acid from the insoluble tissue residue, and separating the dissolved relaxin from said solution of it removed from the tissue residue, by adding to that solution sufficient of a polar organic solvent with a low dielectric constant and which is a member of the class consisting of ethanol, acetone, ethyl ether, and petroleum ether, to precipitate the dissolved relaxin from said removed solution.

References Cited in the file of this patent

Frieden: Archives of Biochem., vol. 29, December 1950, pp. 166–178, particularly pp. 166–168 and 171–178.

Money: Endocrinology, vol. 40, June 1947, pp. 370–374.

Albert: Endocrinology, vol. 39, October 1946, pp. 270–272.

Recent Progress in Hormone Res., vol. 8, 1953, pp. 333 and 339.

Fevold: J.A.C.S., vol. 52, August 1930, pp. 3340, 3342, 3343 and 3345.

UNITED STATES PATENT OFFICE
CERTIFICATE OF CORRECTION

Patent No. 2,930,737                              March 29, 1960

Herman Cohen

It is hereby certified that error appears in the printed specification of the above numbered patent requiring correction and that the said Letters Patent should read as corrected below.

Column 1, line 54, for "acetone;" read -- acetone. --; column 2, line 34, for the year "1933" read -- 1944 --.

Signed and sealed this 25th day of October 1960.

(SEAL)
Attest:

KARL H. AXLINE                                        ROBERT C. WATSON
Attesting Officer                                    Commissioner of Patents